H. SMITH.
DEVICE FOR ELECTROCUTING ANIMALS.
APPLICATION FILED FEB. 3, 1912.
1,075,386.
Patented Oct. 14, 1913.
3 SHEETS—SHEET 1.
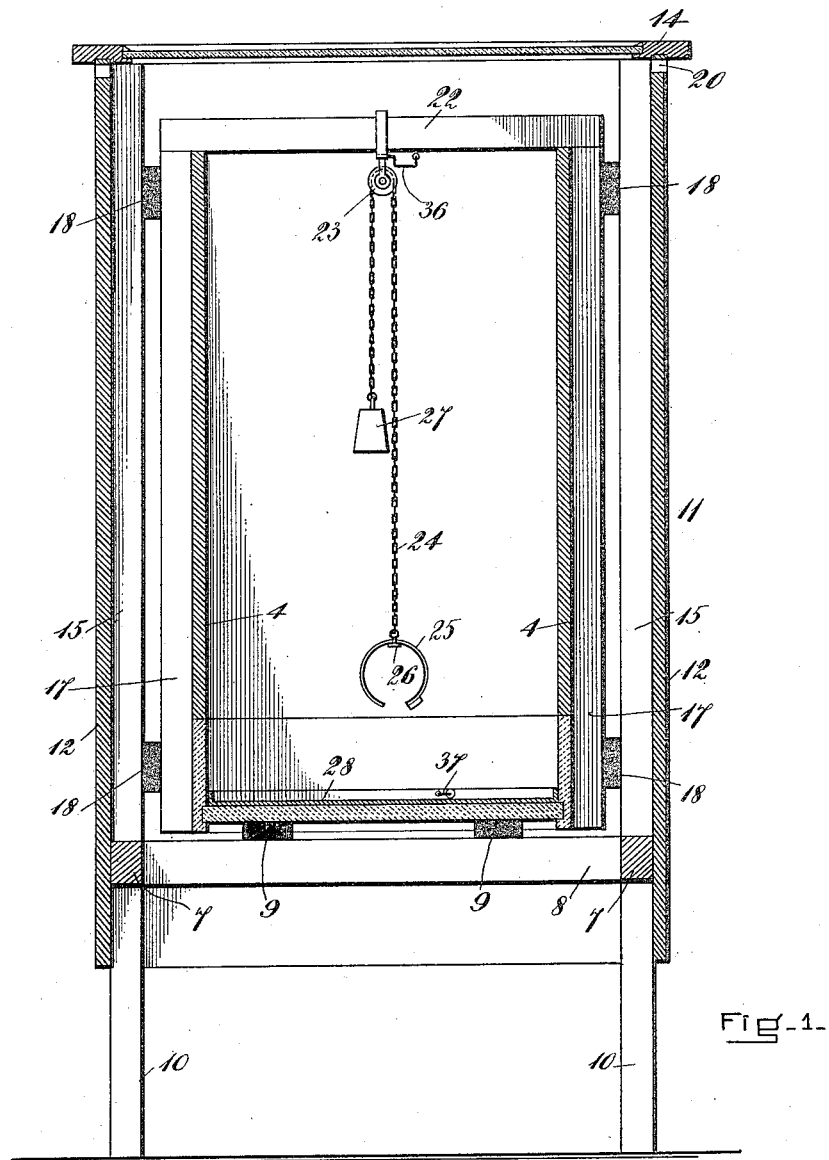
Fig-1-
WITNESSES:
M. E. Flaherty
A. E. O'Brien.
INVENTOR:
Huntington Smith
by
Crale & Hays
his attorneys.

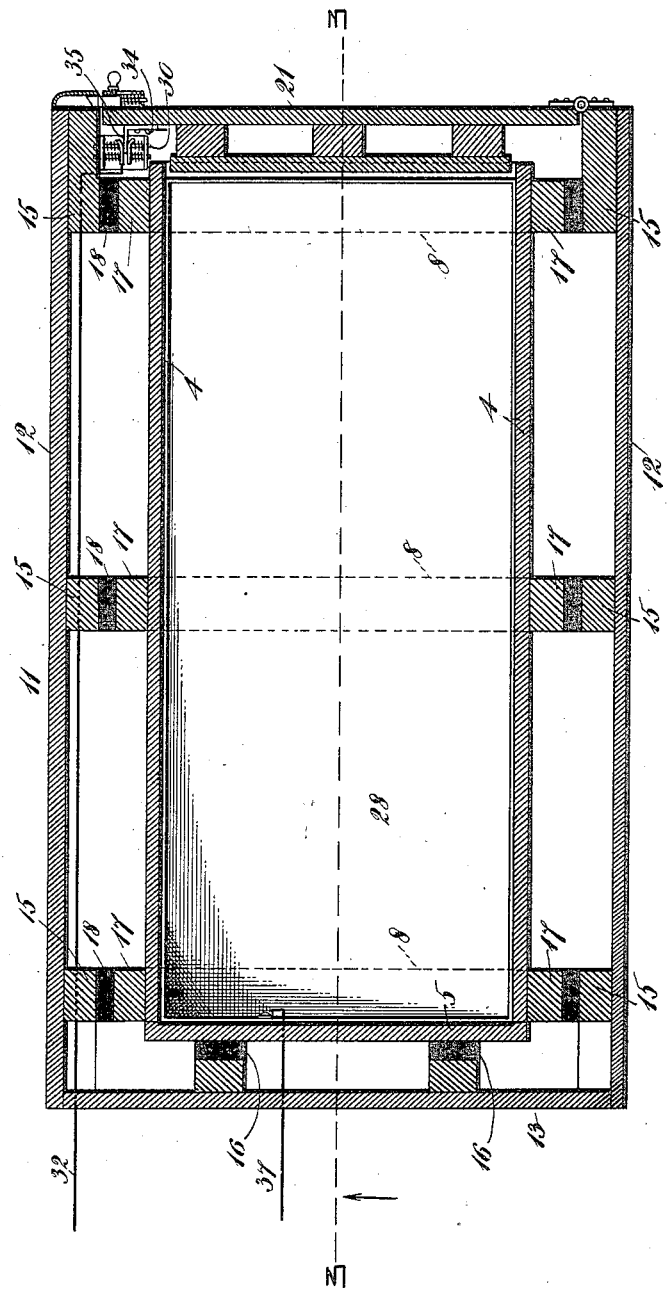

H. SMITH.
DEVICE FOR ELECTROCUTING ANIMALS.
APPLICATION FILED FEB. 3, 1912.
1,075,386.
Patented Oct. 14, 1913.
3 SHEETS—SHEET 3.
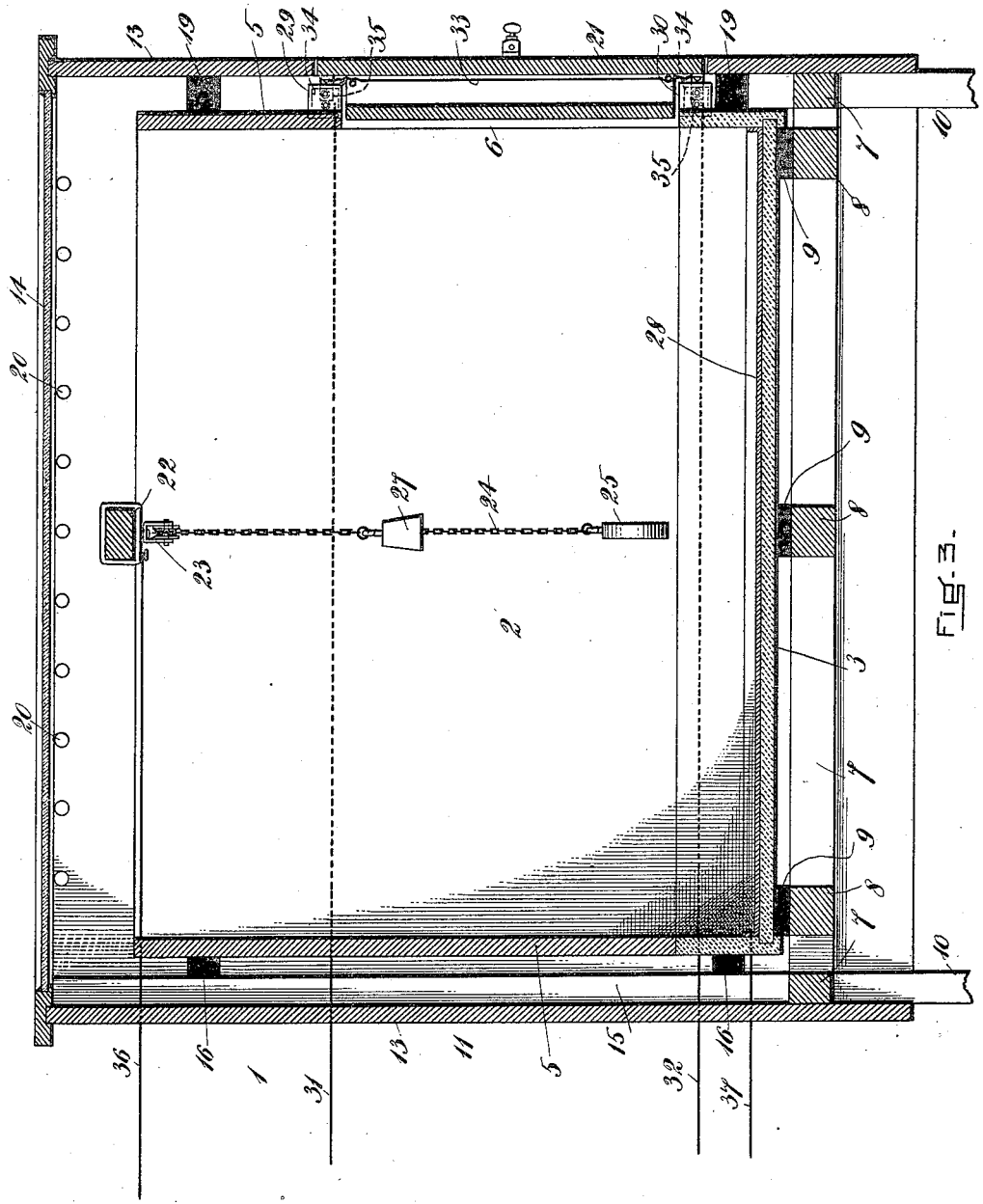

UNITED STATES PATENT OFFICE.

HUNTINGTON SMITH, OF DEDHAM, MASSACHUSETTS.

DEVICE FOR ELECTROCUTING ANIMALS.

1,075,386.     Specification of Letters Patent.     Patented Oct. 14, 1913.

Application filed February 3, 1912. Serial No. 675,380.

*To all whom it may concern:*

Be it known that I, HUNTINGTON SMITH, of Dedham, in the county of Norfolk and State of Massachusetts, a citizen of the United States, have invented a new and useful Improvement in Devices for Electrocuting Animals, of which the following is a full, clear, and exact description, reference being had to the accompanying drawings, forming a part of this specification, in explaining its nature.

My invention relates to an apparatus or device for killing animals by electricity and especially dogs.

The essential object of my invention is to provide an apparatus or device of the above character by which the animals may be killed humanely and quickly and with as little danger to the operator as possible.

My invention can best be understood by reference to the drawings, in which—

Figure 1 shows the apparatus in cross vertical section. Fig. 2 is a cross section of the apparatus, and Fig. 3 is a section taken on line 3—3 of Fig. 2.

Referring to the drawings: 1 represents the electrocuting cage for holding the animal. This cage is a double-walled boxlike structure having formed within it an insulated receptacle 2 in which the animal is placed. The receptacle 2 has a bottom 3, sides 4, 4, and ends 5, 5, the top of the receptacle being open. In one end of the receptacle an opening 6 is formed through which the animal is introduced into it. This opening is closed in a manner which will hereinafter be explained.

The receptacle 2 is supported by a base consisting of bars 7 rectangularly arranged to form a frame larger than the bottom of the receptacle 2 and provided with inside crossbars 8 on which the receptacle rests, with insulating blocks 9 preferably interposed between the bottom of the receptacle and said crossbars. The base consisting of the bars combined as aforesaid, is preferably supported by legs 10. The receptacle 2 is closed by an outer receptacle or cover 11 consisting of sides 12, 12, ends 13, 13 and a top 14. These parts are spaced from the receptacle 2 and are built around and supported by uprights 15 which connect with the rectangularly-arranged bars 7 of the base. The uprights 15 are also spaced from the receptacle 2. Provision is made, however, for the lateral support of the interior receptacle in the following manner: At the rear end of the interior receptacle between it and the adjacent uprights 15 there are interposed insulating blocks 16 secured in any suitable manner. Along the sides of the interior receptacle there are secured to it uprights 17 which extend in line with the uprights 15 adjacent said sides and between these respective sets of uprights are interposed insulating blocks 18 suitably secured. At the front end of the interior receptacle above the opening 2 there is interposed between it and the adjacent front end 13 of the outer receptacle or cover an insulating block 19 suitably retained. By this means the interior receptacle is maintained securely in place and insulated from the outer receptacle or cover.

The top 14 of the outer receptacle 11 is preferably made of glass by which one may be enabled to look into the chamber of the interior receptacle. To provide for ventilation and a proper circulation of air in the interior receptacle openings 20 are cut through the sides of the outer receptacle just adjacent the top thereof. The outer receptacle has in the forward end thereof an opening adjacent the opening 6 into the inner receptacle. This opening and likewise the opening into the inner receptacle is closed by a double-walled, insulated, hinged door 21.

Extending crosswise the top of the inner receptacle 2 is a bar 22. This bar is fixed by securing it to the central ones of the uprights 17 secured to the sides of the inner receptacle and which assist in its lateral retention as aforesaid. Attached in any suitable manner to this crossbar is a pulley 23 around which runs a flexible connection or leash 24 of metal or other suitable conducting material. To one end of this leash is secured a collar 25 of leather or other suitable material and which is adapted to be clasped around the neck of the animal. This collar has on the inside a metallic contact 26 directly connecting with the electric-conducting leash. To the other end of the leash is attached a weight 27 adapted to take up slack in the leash after the collar 25 has been secured to the animal.

The bottom of the receptacle 2 including the lower portion of its sides and ends adjacent said bottom is made of some watertight material having a high electrical resistance and preferably of slate. Over this bottom is laid a plate or flooring 28 of metal or other suitable electric-conducting material. This preferably takes the form of a pan, the edges of the plate being extended up alongside the sides and ends of the receptacle for some distance.

Electrical connection is established through the cage in the following manner: Arranged on and between the walls of the cage and preferably secured to the forward end of the inner receptacle adjacent the front edge of the door 21 when in a closed position are spring contact members 29 and 30, respectively. These members are separated some little distance from one another and with them connect low tension wires 31 and 32. The electrical circuit is completed through the wires 31 and 32 by a wire 33 which runs along the inner face to the outer side of the door 21. This wire 33 is secured to the door at either end by fixtures 34 provided with projecting contact fingers 35 adapted and arranged to have electrical contact with the spring contact members 29 and 30 when the door is closed, the electric circuit then being established through the low tension wires 31, 32 and 33. The low tension wires 31 and 32 lead to a transformer (not shown) of suitable capacity to provide a secondary current of the required pressure. This secondary current enters the cage through high tension wires 36 and 37, respectively, of which the high tension wire 36 is in electrical connection with the pulley 23 and the high tension wire 37 with the plate or pan 28 at the bottom of the receptacle 2.

The operation of the device is as follows: The animal is brought to the door of the cage; the collar 25 placed about its neck and the animal then introduced into the cage, standing upon the bottom conducting plate 28 of the inner receptacle. Any slack in the leash holding the animal is taken up by the weight 27. Up to this time the door of the cage is open and no current is passing through the cage. The instant the door is closed the electric primary circuit is completed as aforesaid by the contact of the fingers 35 with the spring contact members 29 and 30. The electrical connection being thus established through the primary circuit connection will also be established through the secondary circuit by passing through the body of the animal, for the secondary current connecting with the pulley 23 will pass down through the leash to the contact 26 and thence through the body of the animal to the conducting plate or pan 28 on which the animal is standing and thence through the high tension wire 32 connecting with the pan, which completes the circuit.

It will be observed that the operation is one which can be carried on with practically absolute safety to the operator for no current can pass through the cage until the door is closed. Then by reason of the manner in which the inner receptacle is inclosed and insulated especially with respect to the high tension current there is practically no danger to the operator in touching the cage for opening the door and removing the animal and of course after the door is open all current is cut off.

Having thus fully described my invention, I claim and desire to secure by Letters Patent of the United States:—

1. In an electrocuting apparatus for animals, a cage consisting in part of an insulated receptacle having at the bottom thereof a floor of some electric-conducting material forming a terminal of an electric circuit, means forming another terminal of said circuit within said cage, the same comprising a movable attachment of some conducting material attachable to an animal within the cage to be in electrical contact therewith and permit freedom of movement of the animal within the cage, and other connections in circuit with said floor and movable attachment, respectively, whereby an electric current may be applied to an animal standing on said floor and held by said movable attachment.

2. In an electrocuting apparatus for animals, a cage comprising in part an insulated receptacle having an opening therein, and inside said cage separate terminals forming part of an electric circuit and arranged whereby an animal inside said cage has contact respectively therewith, a door closing the opening into said receptacle, other connections in circuit with said terminals, and means whereby the circuit may be completed only after closing said door.

3. In an electrocuting apparatus for animals, a cage comprising in part an insulated receptacle having an opening therein, and inside said cage separate terminals arranged whereby an animal inside said cage has contact respectively therewith, a door closing the opening into said receptacle, wires adapted to form a part of a high tension electric circuit connecting, respectively, inside said cage with said terminals, contact members forming a part of a low tension circuit in electrical connection with said high tension circuit whereby a current may be completed through said high tension circuit upon completing said low tension circuit, and means whereby said low tension circuit may be completed through said members only after closing said door.

4. In an electrocuting apparatus for animals, a cage comprising in part an insulated receptacle having at the bottom thereof a floor of some electric-conducting material, a flexible leash of some electric-conducting material arranged inside the cage and extending into said receptacle to be attachable to an animal to be in electrical contact therewith, the said leash and floor being adapted to form a part of an electric circuit.

5. In an electrocuting apparatus for animals, a cage comprising in part an insulated receptacle having at the bottom thereof a floor of some electric-conducting material, a leash of some electric-conducting material having on the end thereof a collar attachable to an animal, said collar having on the inside thereof a contact-making member in electrical connection with said leash, a pulley over which said leash is adapted to run, a weight carried by the other end of said leash, and wires adapted to form a part of an electric circuit connecting respectively with said pulley and said floor.

6. In an electrocuting apparatus for animals, a cage comprising in part an insulated receptacle having at the bottom thereof a floor of some electric-conducting material, a leash of some electric-conducting material having on the end thereof a collar attachable to an animl to be in electrical contact therewith, means for taking up slack in said leash, and other connections in circuit with said floor and leash, respectively, whereby an electric current may be applied to an animal standing on said floor and held by said leash.

7. In an electrocuting apparatus for animals, a cage having an inner receptacle provided with an opening therein, an outer receptacle inclosing said inner receptacle spaced and insulated therefrom with an opening therein in line with the opening into said inner receptacle, a door closing said openings, a floor of some electric-conducting material laid in the bottom of said inner receptacle, a fixture of some electric-conducting material arranged within said cage to extend into said interior receptacle and be in electrical contact with an animal contained therein, electric-conducting wires extending within said cage and connecting respectively with said fixture and said floor, contact-making members arranged adjacent the front edge of said door when in a closed position, electric-conducting wires connecting respectively therewith, and means whereby an electric circuit may be completed between said contact-forming members when said door is in a closed position.

HUNTINGTON SMITH.

Witnesses:
JOHN E. R. HAYES,
M. E. FLAHERTY.

---

Copies of this patent may be obtained for five cents each, by addressing the "Commissioner of Patents, Washington, D. C."